April 4, 1967

W. E. HILL 3,312,041

DRIER AND METHOD

Filed Sept. 30, 1963

INVENTOR.
WILKES E. HILL
BY
Teare, Fetzer, Teare
ATTORNEYS

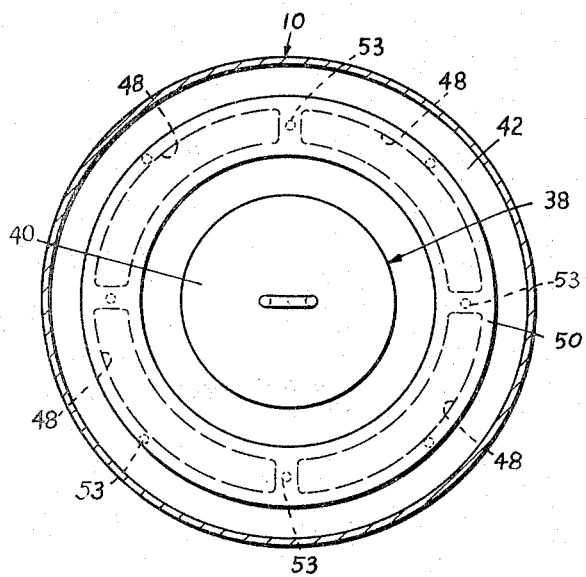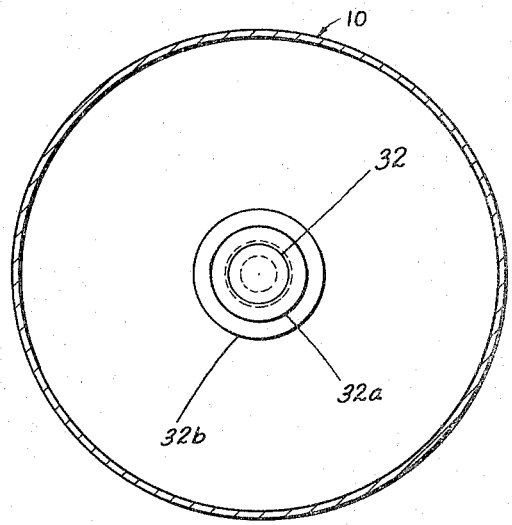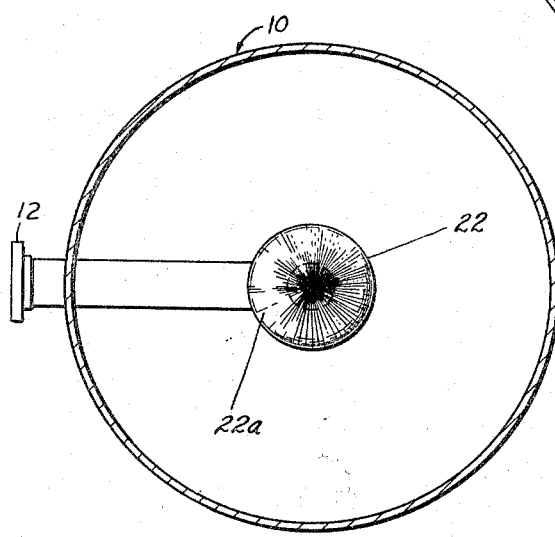

United States Patent Office 3,312,041
Patented Apr. 4, 1967

3,312,041
DRIER AND METHOD
Wilkes E. Hill, Erie, Pa., assignor to Van Products Company, Erie, Pa., a corporation of Pennsylvania
Filed Sept. 30, 1963, Ser. No. 312,620
20 Claims. (Cl. 55—30)

This invention relates in general to the art of drying, and more particularly to a drying device for removing moisture and other impurities from pressurized air or gas, and a method for so drying the air or gas.

There are various arrangements known in the air and/or gas drying art for removing moisture and other impurities from pressurized air or gas, and more particularly it it known in the art to pass air or gas through a bed of deliquescent desiccant material to remove moisture and/or other impurities from the air or gas. However, as the use of compressed air and gas becomes more and more prevalent in industry, the requirements for air having substantially no moisture therein increases, and there is a continuous demand for driers that are more efficient in the removal of moisture from the compressed air or gas.

The present invention provides a novel arrangement of compressed air or gas drier which makes more effective the removal of moisture by a deliquescent desiccant material, from the compressed air or gas passed therethrough, and a drier that embodies a plurality of beds or layers of the deliquescent material disposed in a novel relationship for materially increasing the efficiency of the moisture removal operations of the drier.

Accordingly, an object of the present invention is to provide a novel drier for removing moisture from pressurized air or gas.

Another object of the invention is to provide a compressed air or gas drier of the chemical deliquescent desiccant type including means for taking the incoming air and cooling it by simplified means upon the air's entry into the drier and then passing the air through a first bed of deliquescent desiccant material and then into an expansion chamber where the expanding air is permitted to cool, and then once more passing the cooled expanded air through another bed of deliquescent desiccant material, whereby substantially all of the moisture in the air is eliminated therefrom.

Another object of the invention is to provide a deliquescent desiccant type of air drier comprising a tank having an inlet for the pressurized air or gas that is to be dried, and wherein such incoming air or gas is first passed through an accelerating means for causing the air to be expelled generally radially out under relatively high velocity against the inner surfaces of the tank whereby moisture in the air forms into larger particles and the air is cooled by its contact with the tank walls which are at ambient temperature. The air is then passed up generally obliquely through a first bed of deliquescent desiccant material with such first bed of desiccant material being maintained at a substantially constant thickness or depth by a novel feeding mechanism, and with the air then passing into an expansion chamber where it can expand and cool, and then whereupon air is passed through a further polishing bed of deliquescent desiccant material where any remaining moisture in the air or gas is extracted from the air or gas, and then the air or gas is withdrawn from the tank for use in a compression air or gas system.

A still further object of the invention is to provide an air or gas drier of the latter mentioned type including distributing rings through which the air is passed immediately before it is sent through the first bed of desiccant material for obtaining more even and efficient distribution of the air through the bed, and wherein diffusing or distributing means are also provided for diffusing the air more evenly through the second bed of desiccant material.

Another object of the invention is to provide a drier of the above general type embodying a novel arrangement for maintaining a generally constant level of deliquescent desiccant material in a bed thereof, and in a manner to increase the efficiency of moisture removal from the air or gas passing through such bed.

A still further object of the invention is to provide a novel method of drying compressed air or gas for use in a compressed air or gas system.

Other objects and advantages of the invention will be apparent from the following description taken in conjunction with the accompanying drawings wherein:

FIG. 2 is a horizontal sectional view taken generally along the plane of line 2—2 of FIG. 1 looking in the direction of the arrows;

FIG. 3 is a horizontal sectional view taken generally along the plane of line 3—3 of FIG. 1 looking in the direction of the arrows;

FIG. 4 is a horizontal sectional view taken generally along the plane of line 4—4 of FIG. 1 looking in the direction of the arrows.

Figure 1:
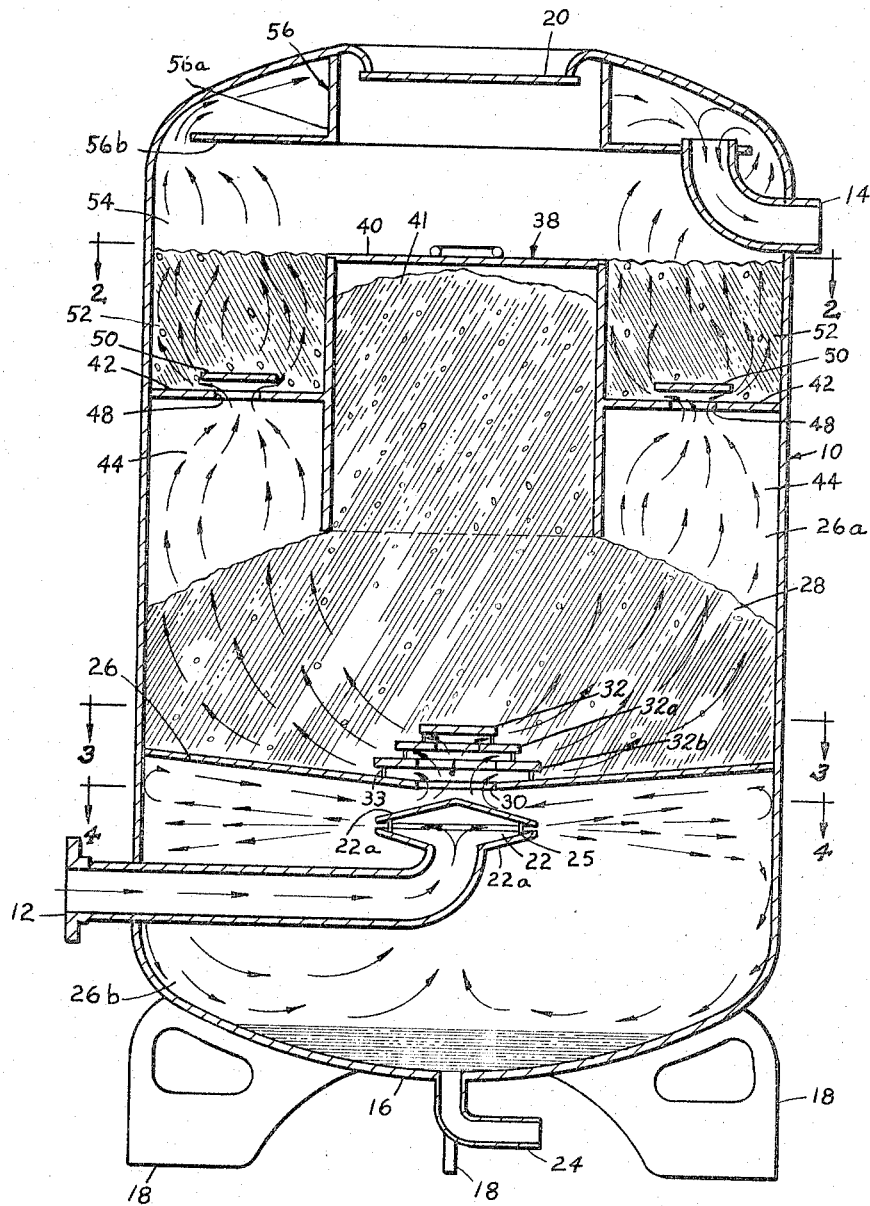
FIG. 1 is a sectioned, elevational view of a drier embodying the instant invention.

Referring now again to the drawings, there is shown a drier comprising a preferably metal tank or enclosure 10 which in the embodiment illustrated is of cylindrical exterior configuration, having an inlet 12 for receiving pressurized air or gas, and an outlet 14 for exhausting the air or gas from the tank. The tank preferably has a curved bottom portion 16, as shown, for facilitating the collection of liquid resulting from the extraction of moisture from the air or gas, and as will be hereinafter discussed in greater detail. There also may be provided a support 18 for standing the tank in a generally upright condition.

An air tight filler hatch 20 may be provided at the upper end of the tank centrally thereof, for replenishment of the chemical deliquescent desiccant utilized in the tank for drying the air or gas. A drain 24 may be provided in the bottom wall for draining liquid from the tank, and with the drain preferably being provided with a suitable trap (not shown) in any conventional manner. Recording means such as for instance a thermometer and a pressure gauge (not shown) are preferably mounted on the side wall of the tank for indicating respectively the temperature and pressure of the air or gas in the tank, and in any conventional or suitable manner.

The air inlet 12 comprises a pipe or passageway extending from the side of the tank inwardly to approximately the axial center of the tank where it curves upwardly and is connected to an acceleration chamber 22. Accelerator chamber 22 may be formed of a pair of plates 22a of generally conical configuration disposed in confronting but vertically spaced relationship so as to define a constricted circumferential opening 24. Plates 22a may be held in said spaced relationship by pins 25.

Accelerator chamber 22 causes expulsion of the air at high velocity radially outwardly against the interior surface of the tank or shell 10. The walls of the tank are generally at an ambient temperature which is considerably lower than the temperature of the compressed air or gas coming into the tank. The air after impacting the cooler sides of the tank, rushes outwardly from the area of impact and moves back toward the center portion of the tank and as generally shown by the arrows in FIG. 1. It will be seen that this outflow of air from the accelerator chamber 22 is radially throughout its full circumferential extent and therefore the direction of the air outwardly toward the interior surface of the tank and then back toward the axial center of the tank is a continuous flow arrangement with the air being violently dispersed upon impact with the interior of the tank and at the same time such impact causing moisture particles in the air to combine into larger particles, and drain down the sides of the wall of the tank into the sump.

Plate 26 divides the tank into an upper portion 26a and a lower portion 26b and with the plate providing a support for a first bed 28 of chemical deliquescent desiccant material. The plate 26 is provided with a central circular aperture 30 through which the pressurized air or gas passes after being initially cooled by engagement with the tank walls, and disposed above aperture 30 is a plurality of distributing rings 32, 32a, 32b disposed in axial alignment with aperture 30 and with rings 32a and 32b having centrally disposed diminishing size, circular openings therein through which the air rushes. Rings 32, 32a, 32b may be disposed in vertically spaced relation by spacer pins 33. Rings 32, 32a, 32b break up and distribute the air to direct it generally radially outwardly therefrom whereupon the air passes through the bed 28 of chemical desiccant material. The deliquescent desiccant material may be of any suitable type such as for instance, a mixture of hygroscopic materials in pellet or tablet form, and which is adapted to absorb moisture from the air or gas as it passes through the desiccant material, and form a solution which oozes or flows down into the sump. In this connection it will be seen that the divider plate 26 slopes toward the central opening 30 therethrough, and facilitates the flow of the solution of deliquescent desiccant material and moisture down to the bottom chamber in the tank.

The level of the desiccant material in bed 28 is maintained at a predetermined height. To accomplish this, a hopper arrangement 38 is provided, which hopper arrangement comprises a tubular member open at both the upper and the lower ends thereof, and which tubular member may be provided with a preferably air-tight, removable cover member 40 at its upper end. The chemical desiccant material preferably in tablet or pellet form is fed through the pressure tight removable cover 20 opening down into the hopper 38 after removal of the latter's cover 40, as needed to maintain a quantity 41 of desiccant material in the hopper. As the desiccant material in the bed 28 absorbs moisture and in the lower portion thereof dissolves into solution, the hopper automatically feeds more of the material down by gravity to provide a generally constant level of desiccant material through which the air passes. The hopper may be supported in its central position in the tank 10 and at a predetermined elevation above plate 26 by means of a circumferentially extending plate 42 which may be secured by any suitable means to the sides of the tank.

Plate 42 in conjunction with the exterior of hopper 38 and the interior surface of the tank 10 defines a circumferentially extending expansion area 44 of considerable size in the drier, wherein the air coming up from the upper surface of the bed 28 of desiccant after passing through the great multitude of tortuous paths in the bed formed by the pellets of desiccant, slows down in its velocity and expands. The temperature of the air is thus lowered, thereby further tending to condense out moisture in the air. Plate 42 is provided with openings 48 therethrough, through which the cooled air passes from area 44. A continuous diffusing ring 50 is preferably provided in superimposed relationship with respect to openings 48 and the air is diffused by ring 50 outwardly through another but shallower depth bed 52 of the chemical deliquescent desiccant material. This bed is identified as a polishing bed, where any remaining moisture in the air is removed therefrom. The ring 50 may be held in spaced relation to plate 42 by spacer pins 53.

The air passes up through the tortuous paths in the chemical desiccant pellet material in bed 52 and then passes into the upper expansion area 54 of the tank. From the upper expansion area of the tank the air is drawn into a collection ring 56 which depends from the upper wall of the tank and is formed by a cylindrical section 56a and a generally horizontal section 56b. Section 56b extends outwardly into close proximity to the interior surface of the tank whereby the air or gas in the upper expansion area has to generally engage the tank's interior surface in passing to the outlet 14. Accordingly the air may be further cooled by the lower temperature of the tank walls.

Initially extending downwardly from the horizontal plate portion 56b and then turning to extend through the side of the tank 10 is the outlet pipe 14. As can be seen in FIG. 1, the upper end of the pipe preferably extends above the level of the collection ring section 56b.

It will be seen, therefore, that operation of the drier may entail the following: the air or gas initially enters the tank at inlet 12 and is directed to the axial center thereof, and then is ejected under high velocity out toward the walls of the tank where it impinges upon the interior surface of the tank, and the air is cooled and moisture is removed from the air. The incoming air or gas may be at pressures ranging from substantially atmospheric to 20,000 p.s.i. and preferably is at a temperature below 100° F. However, in the interests of efficient operation of the accelerator 22, the incoming air is preferably at at least 30 p.s.i. Then the air passes through a diffusing or distributing portion 30, 32, 32a, 32b and obliquely up through a first deliquescent desiccant bed of material. The removable cover 40 on the hopper tube 38 prevents the air or gas from travelling up through the storage or hopper area, and the oblique or diagonal path of the air to the expansion area 44 provides a greater depth of desiccant bed than if the air would be travelling in a straight vertical direction up through the drier.

The air entering the expansion chamber or area 44 is reduced in velocity and cooled due to the permitted expansion, thereby further removing moisture, and then the air passes up through the polishing bed 52 of deliquescent desiccant material, and any remaining moisture is removed from the air. The air or gas then passes into the upper expansion area 54 of the drier, and then into the collector ring 56. Thus, the air or gas is made as dry as possible in its travel through the drier unit. It will be understood that the deliquescent desiccant material or pellets of the beds 28 and 52, and especially that of bed 28, absorb moisture and dissolve. The resulting solution drips down onto plate 26 from which it flows through aperture 30 to the drain 24. As the bed 28 on its lower portion gradually dissolves away, it is automatically maintained at a constant depth by the gravity feed of hopper 38. As the solution of desiccant drips down through aperture 30, and falls, it engages the top surface 22a of the accelerator chamber 22 which is disposed immediately below aperture 30. From the top surface of the accelerator chamber 22, the solution may fall to the bottom of the tank to collect as shown. The chemical solution of desiccant engaging the relatively high velocity air or gas expelled from chamber 22 distributes the solution, or generally a mist of the chemical solution, throughout the lower portion 26b of the tank and causes removal of moisture from the incoming air or gas prior to its passage up through aperture 30 and beds 28 and 52 of the tabletized desiccant.

In the following claims, the term "gas" is used, which term will be understood to include air, since air of course is a gas.

From the foregoing discussion and accompanying drawings it will be seen that the invention provides a novel arrangement of drier which greatly increases the efficiency of deliquescent desiccant types of driers and provides an arrangement that removes a much greater proportion of moisture from the air or gas than those arrangements heretofore known. The invention also provides a novel method of drying air or gas.

The terms and expressions which have been used are used as terms of description and not of limitation, and

I claim:

1. A drier for compressed gas comprising an enclosure having a gas inlet and a gas outlet, means for supporting chemical deliquescent desiccant material in the drier, said means being disposed in vertically spaced relationship to one another for providing spaced beds of the deliquescent desiccant material, said spaced means being disposed intermediate said inlet and said outlet thereby providing for passage of the gas through the spaced beds of desiccant, and feeder means in said enclosure for automatically maintaining at least one of the beds of desiccant at a constant depth, said feeder means having a lower exit end for discharge of the desiccant material, said lower end terminating below an upper one of said spaced means and in predetermined upwardly spaced relation to a lower one of said spaced means, and means on the upper end of said feeder means for preventing passage of gas through said feeder means.

2. A drier for compressed gas comprising an enclosure having an inlet and an outlet, said inlet and outlet being vertically spaced from one another, means disposed intermediate said inlet and said outlet for supporting a bed of chemical deliquescent desiccant material thereon and through which the gas is adapted to pass, fluid transmitting means coupled to said inlet for conveying the gas to substantially an axial center of the enclosure, and means disposed in downward vertically spaced relation to said desiccant supporting means and coacting with said fluid transmitting means for ejecting the gas under high velocity generally radially outwardly to cause the gas to impinge upon the interior sufaces of the enclosure below said desiccant supporting means prior to passing of the gas through the deliquescent desiccant material, and feeder means in said enclosure for maintaining the bed of the chemical deliquescent desiccant material at a substantially constant depth, said feeder means having an open lower end for discharge of desiccant material therethrough and a closeable upper end, said lower discharge end being in predetermined upwardly spaced relation to said desiccant supporting means.

3. A drier for compressed gas comprising an enclosure having a gas inlet and a gas outlet, said inlet and outlet being vertically spaced from one another, means disposed intermediate said inlet and said outlet adapted for supporting chemical deliquescent desiccant material thereon and through which the gas is adapted to pass, said means being oriented in vertically spaced relation for providing a plurality of desiccant beds in the drier, feeder means in said enclosure for automatically feeding chemical desiccant material down onto the lower of said beds, the lower exit end of said feeder means being disposed in upwardly spaced relationship to the lower one of said vertically spaced desiccant supporting means and the upper end of said feeder means having means thereon for preventing the passage of gas through said feeder means, and means in the drier disposed below said desiccant supporting means for conveying the gas to substantially an axial center of the enclosure below said desiccant supporting means and for then ejecting the air or gas under high velocity outwardly into engagement with the interior walls of the enclosure prior to passage of the gas through the desiccant beds.

4. A drier for compressed gas comprising, an enclosure having a gas inlet and a gas outlet, means for supporting chemical deliquescent desiccant material in the drier, said means being disposed in vertically spaced relationship to one another for providing spaced beds of deliquescent desiccant material, said spaced means being disposed intermediate said inlet and said outlet thereby providing for passage of the gas through the spaced beds of desiccant, and feeder means for automatically maintaining at least one of the beds of desiccant at a constant depth, said feeder means comprising a hopper supported centrally of the enclosure in spaced relation to the side walls thereof, said hopper having a removable cover on the upper end thereof and being open on the bottom end thereof, the bottom end of said hopper terminating below the upper of said desiccant supporting means and above the lower of said desiccant supporting means, in predetermined space relationship to the last mentioned supporting means, said hopper being adapted to receive a supply of the desiccant material therein and to feed it automatically by gravity down onto said last mentioned desiccant supporting means.

5. A drier in accordance with claim 4, wherein said last mentioned desiccant supporting means comprises a plate dividing the enclosure into an upper section and a lower section, said plate having an aperture therethrough disposed generally centrally thereof, and distributing means disposed axially above said aperture for distributing the gas obliquely outwardly from the distributing means in its passage through the associated bed of desiccant material.

6. A drier in accordance with claim 4 wherein said desiccant supporting means and the hopper define in conjunction with the interior of the enclosure, an expansion area in which the gas is adapted to expand after passing through a first desiccant bed.

7. A drier in accordance with claim 4 wherein said upper desiccant supporting means comprises aperture means therethrough through which is adapted to pass the gas after having passed through a first bed of desiccant material, said upper supporting means supporting said hopper in its centrally oriented relationship in the enclosure.

8. A drier in accordance with claim 4 including a collection means disposed adjacent the upper end of the enclosure in vertically spaced relationship to the hopper and adapted for directing the gas into contact with the walls of the enclosure prior to its passage to the drier outlet.

9. A drier in accordance with claim 8 wherein the collection means comprises a vertically oriented tube secured to the top of the drier and depending therefrom, and a generally horizontal plate extending outwardly into close proximity to the interior walls of the enclosure, and with said outlet extending through the horizontal plate and above the latter.

10. A drier in accordance with claim 8 including accelerator means disposed in substantially an axial center of the enclosure, and means for conveying the inlet gas from said inlet to the accelerator means, the accelerator means being adapted to expel the gas outwardly into striking engagement with the walls of the enclosure for cooling the gas.

11. A compressed gas drier comprising a generally vertically oriented tank having a gas inlet at the bottom portion thereof and a gas outlet at the top portion thereof, accelerator means disposed at substantially the axial center of the tank, transmittal means connecting the accelerator means to the inlet for transmitting the inlet gas to the accelerator means, said accelerator means being adapted to expel the gas outwardly into striking engagement with the interior walls of the tank, a deliquescent desiccant bed supporting plate disposed above said accelerator means, said plate having an aperture centrally thereof and being adapted to support a bed of chemical deliquescent desiccant material, distributing means disposed above said aperture in general axial alignment therewith, and adapted for distributing the gas generally obliquely outwardly therefrom in its passage through the bed of desiccant material, a second deliquescent desiccant bed supporting plate disposed in vertically spaced relation to the first mentioned plate, said second plate having apertures therethrough through which is adapted to pass gas after the latter passes through the first bed, hopper means disposed centrally of said tank, said hopper means being closed at one end by means of a cover which is removable therefrom and at the other end thereof being open, and being adapted to receive a supply of deliquescent desiccant material and to feed it automatically by gravity downwardly to the first mentioned desiccant supporting plate, the open end of said hopper means being spaced in predetermined relation to the first mentioned supporting plate and extending a predetermined distance below the second mentioned desiccant supporting plate, and said outlet being disposed above the upper end of said hopper means.

12. A drier in accordance with claim 11 including diffusing means disposed above said apertures in said second mentioned desiccant supporting plate and adapted to distribute the gas outwardly therefrom in its passage through the second desiccant bed.

13. A drier in accordance with claim 12 including a collecting ring depending from the upper end of the tank and comprising a generally horizontally extending section which forces the gas outwardly into engagement with the interior surfaces of the tank in the passage of the gas to the outlet.

14. A method of drying compressed gas comprising taking incoming gas and cooling the same, then passing the cooled gas through a first chemical bed of deliquescent desiccant material to remove moisture therefrom, reducing the velocity of all of the gas immediately after passage thereof through the chemical bed and permitting it to expand and cool, then passing the gas through a second chemical bed of deliquescent desiccant material to further remove moisture therefrom.

15. A method in accordance with claim 14 including further cooling of the gas after passage through the second bed.

16. A method for drying compressed gas in a deliquescent desiccant type of drier having an enclosure with a gas inlet and an outlet comprising transmitting the gas to be dried to substantially the axial center of the drier enclosure, expelling the gas under high velocity radially outwardly into impacting engagement with the interior surfaces of the drier enclosure for cooling the gas, and then passing the cooled gas through spaced beds of chemical deliquescent desiccant material for removing moisture from the gas, and maintaining the depth of desiccant material of the first bed through which the gas passes, by continuously feeding said first bed from a supply of deliquescent desiccant material stored in said drier, and through which supply no gas flows during passage of the gas through the drier.

17. A method in accordance with claim 16 including expanding and cooling the gas immediately after it passes through the first bed of desiccant material prior to its passage through the second bed of desiccant material.

18. A method in accordance with claim 16 including the step of directing the gas into engagement with the interior surfaces of the drier enclosure after its passage through the second bed of desiccant material and prior to its passage to the gas outlet of the drier enclosure.

19. A method in accordance with claim 17 including causing the gas to pass obliquely through said first bed.

20. A drier for compressed gas comprising an enclosure having a gas inlet and a gas outlet, means in the drier supporting chemical deliquescent desiccant material, said means being disposed in vertically spaced relation to one another for providing spaced beds of the desiccant material, said spaced means being disposed intermediate said inlet and said outlet thereby providing for passage of the gas through the spaced beds of desiccant, the lowermost of said beds being of a generally greater depth than the uppermost of said beds, and feeder means in said enclosure for automatically maintaining at least one of said beds of desiccant at a substantially constant depth, said feeder means having a lower exit end for discharge of said desiccant material, said lower end terminating below the uppermost of said spaced means and in predetermined upwardly spaced relation to the lowermost of said spaced means, and said feeder means having means on the upper end thereof for preventing passage of gas through said feeder means, said upper end being openable for replenishing the supply of deliquescent desiccant material in said feeder means.

References Cited by the Examiner

UNITED STATES PATENTS

| | | | |
|---|---|---|---|
| 1,376,691 | 5/1921 | Hartman | 55—388 |
| 2,174,186 | 9/1939 | Downs et al. | 55—388 X |
| 2,203,685 | 6/1940 | Kaufman | 55—221 |
| 2,747,681 | 5/1956 | Schuftan et al. | 55—62 X |
| 3,246,454 | 4/1966 | Norton | 55—316 |

FOREIGN PATENTS 798,088 7/1958 Great Britain.

REUBEN FRIEDMAN, *Primary Examiner.*

C. HART, *Assistant Examiner.*